US009681770B2

(12) United States Patent
Backaert et al.

(10) Patent No.: US 9,681,770 B2
(45) Date of Patent: Jun. 20, 2017

(54) COOKWARE PRESSURE INDICATOR

(71) Applicant: Dart Industries Inc., Orlando, FL (US)

(72) Inventors: Dimitri M. C. J. Backaert, Moorsel (BE); Ralph F. E. Eikelenberg, Gooik (BE); Ine Vandaele, Moorsele (BE); Ledu Q. Nguyen, Orlando, FL (US); Edward M. Poslinski, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 14/814,573

(22) Filed: Jul. 31, 2015

(65) Prior Publication Data
US 2015/0335191 A1   Nov. 26, 2015

Related U.S. Application Data

(62) Division of application No. 13/898,187, filed on May 20, 2013, now Pat. No. 9,456,713.

(51) Int. Cl.
| | |
|---|---|
| *H05B 6/80* | (2006.01) |
| *A47J 27/09* | (2006.01) |
| *A47J 27/08* | (2006.01) |
| *A47J 36/06* | (2006.01) |
| *A47J 36/02* | (2006.01) |
| *A47J 27/092* | (2006.01) |
| *A47J 27/088* | (2006.01) |

(52) U.S. Cl.
CPC ............ *A47J 27/09* (2013.01); *A47J 27/0806* (2013.01); *A47J 27/088* (2013.01); *A47J 27/092* (2013.01); *A47J 36/027* (2013.01); *A47J 36/06* (2013.01)

(58) Field of Classification Search
CPC ...... A47J 36/027; A47J 27/0806; A47J 36/06; A47J 27/092; A47J 27/088; A47J 27/09
USPC ............... 219/732, 725, 731, 734, 735, 686; 99/331, 337, 342, 403; 220/203.5, 203.7, 220/203.9, 203.11, 316, 326, 324, 573.1, 220/367.1, 203.01, 203.12; 426/501, 509, 426/118, 234, 243, 403; 428/136, 35.7
See application file for complete search history.

(56) References Cited

U.S. PATENT DOCUMENTS

| | | | |
|---|---|---|---|
| 2,622,187 A | 12/1952 | Welch | |
| 3,055,536 A * | 9/1962 | Dieny | ................. A47J 27/0815 220/203.11 |
| 4,024,982 A | 5/1977 | Schultz | |
| 4,490,597 A | 12/1984 | Mengel | |

(Continued)

*Primary Examiner* — Quang Van
(74) *Attorney, Agent, or Firm* — Taylor J. Ross

(57) ABSTRACT

A microwave pressure cooker including safety interlock mechanisms. A blow vent is provided in cooker lid, and a lock bar is pivoted to cooker lid in a position to block blow vent when lock bar is resting under its own weight. Free end of lock bar includes a lock tab. Lock tab extends through slot at periphery of lid. Cooker base includes handle with a cam section ending in a lock wall. Cooker lid is placed on base in a release position and rotated to a locking position. During this rotation lock tab rides over cam section and then falls adjacent lock wall, thus sealing blow vent. After cooking cover is physically prevented from rotating back to release position by lock tab abutting lock wall. User must physically lift lock bar to unseal blow vent to ensure internal pressure is released. A spline may hold lock bar in raised position.

3 Claims, 5 Drawing Sheets

(56) References Cited

U.S. PATENT DOCUMENTS

| | | | |
|---|---|---|---|
| 4,620,643 A | * | 11/1986 | Sebillotte .............. A47J 27/092 220/316 |
| 4,796,776 A | | 1/1989 | Dalquist et al. |
| 5,229,563 A | | 7/1993 | Isogai et al. |
| 5,310,981 A | | 5/1994 | Sarnoff et al. |
| 8,247,751 B2 | | 8/2012 | Jagannathan |

* cited by examiner

COOKWARE PRESSURE INDICATOR

CROSS REFERENCE TO RELATED APPLICATIONS

This application is related to co-pending Ser. No. 29/455,339 the contents of which are included herein by reference, and is a divisional application of Ser. No. 13/898,187, filed May 20, 2013.

STATEMENT REGARDING FEDERALLY SPONSORED RESEARCH

Not applicable.

BACKGROUND OF THE INVENTION

The present invention relates in general to cooking implements, and pressure cookers for food. In particular, the present invention relates to an improved microwave pressure cooker having safety interlock features, and a guard against under-pressure locking.

Pressure cookers for use in microwave ovens are known in the literature, with U.S. Pat. No. 4,796,776 to Dalquist et al. being a good example. In practice, however, these devices must meet various regulations for safety including safety interlock features. The nature of these microwave pressure cookers do not lend themselves to existing interlock arrangements.

SUMMARY OF THE INVENTION

An object of the present invention is to provide a microwave pressure cooker providing safety interlock features.

Another object of the present invention is to provide a microwave pressure cooker having a positive safety lock preventing opening of the cooker without release of internal pressure.

Yet another object of the present invention is to provide a pressure indicator which also functions to prevent negative pressure within the cooker during cooling.

These and other objects are achieved by a microwave pressure cooker. The pressure cooker includes safety interlock meeting current regulations. A blow vent is provided in the cooker lid, and a lock bar is pivoted to the cooker lid in a position to block the blow vent when the lock bar is resting under its own weight. The free end of the lock bar includes a lock tab with a spline projecting outward. The lock tab extends through a slot at the periphery of the lid. The cooker base include a handle with a cam section ending in a lock wall. The cooker lid is placed on the base in a release position and rotated to a locking position. During this rotation the lock tab rides over the cam section and then falls adjacent the lock wall, thus sealing the blow vent. After cooking the cover is physically prevented from rotating back to the release position by the lock tab abutting the lock wall. The user must physically lift the lock bar which in turn unseals the blow vent to ensure internal pressure is released. The spline may hold the lock bar in the raised position during rotation to the release position.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
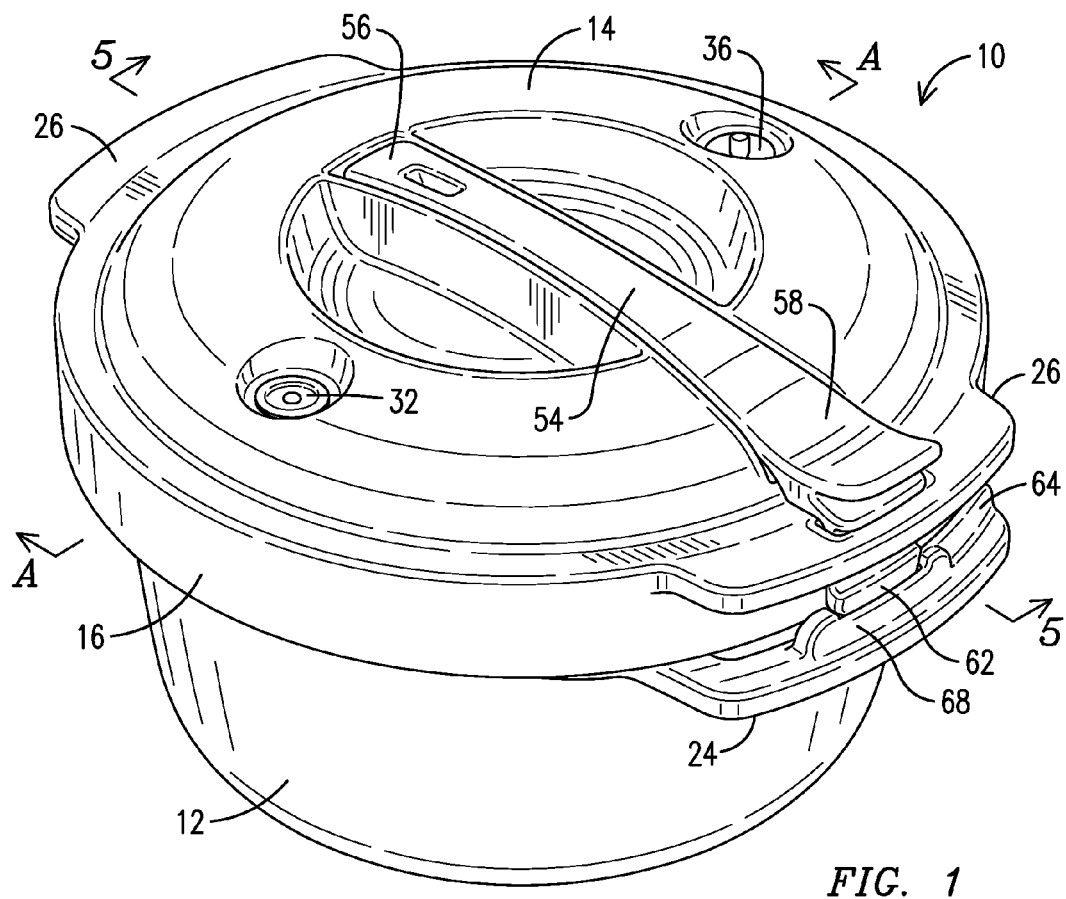
FIG. 1 is a top perspective view of a microwave pressure cooker according to the present invention in the locking position.
Figure 8:
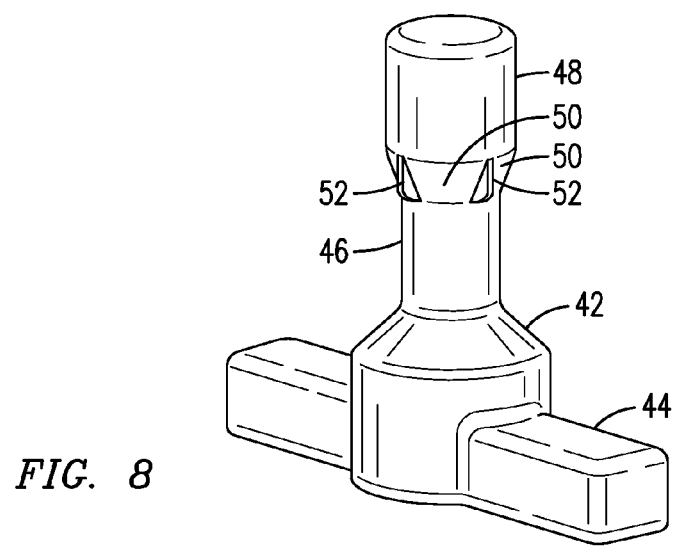
FIG. 8 is a top perspective view of a pressure indicator stem according to the present invention.
Figure 2:
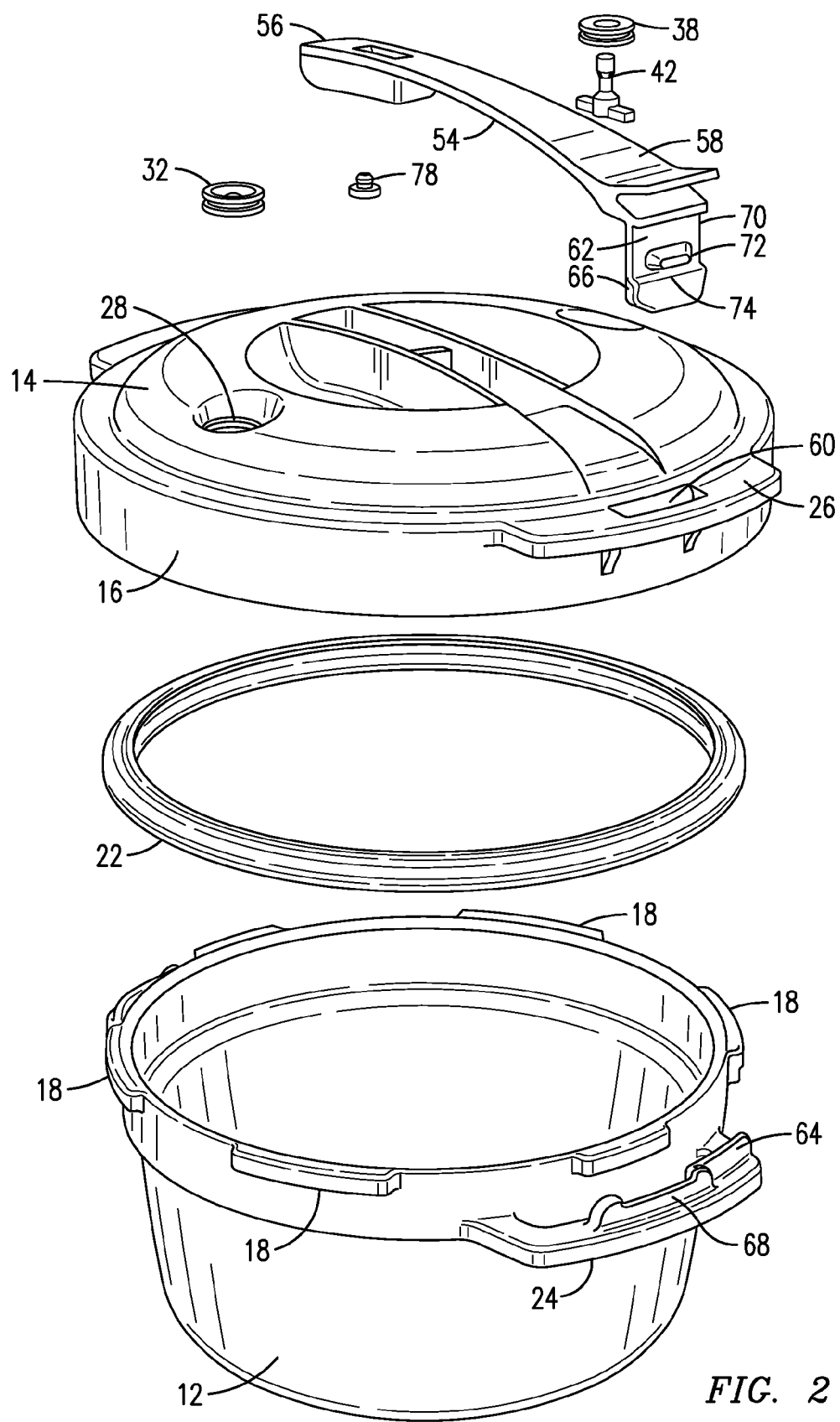
FIG. 2 is a top perspective exploded view thereof.
Figure 3:
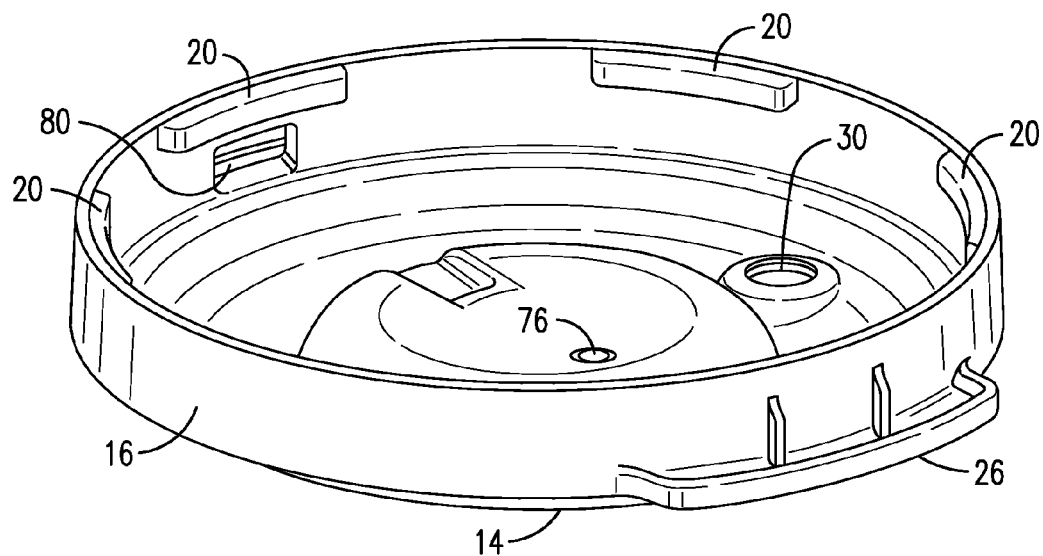
FIG. 3 is a bottom perspective view of the lid of the pressure cooker.

With reference to FIG. 1, a microwave pressure cooker according to the present invention is generally designated by reference numeral 10. The cooker 10 includes a base 12 in the form of a bowl with an upper peripheral edge, and a cover 14 which is generally concave with a downwardly extending lip 16 sized to fit over the edge of the base 12. The cover and base are formed of a polymer suitable for the microwave. As seen in FIG. 2, the base 12 includes a set of spaced bayonet ledges 18 extending radially outward from, and spaced peripherally about, the upper peripheral edge. Similarly, the cover 14 includes a set of mating ledges 20 extending radially inward from, and spaced peripherally about, the lip 16. As is known in the art, the mating ledges 20 may pass vertically between the bayonet ledges 18 only in a release position of the cover 14 with respect to the base 12. By rotating the cover 14 with respect to the base from this release position the mating ledges 20 will pass below the bayonet ledges until the cover 14 reaches a locking position with respect to the base 12. In this locking position the interference of the ledges 18 and 20 prevents the cover from rising with respect to the base, and this is the operating condition of the cooker 10.

As is known in the art, an annular gasket 22 is provided to seal between the base 12 and cover 14. The gasket 22 preferably will be loosely retained within the lip 16 of the cover 14 to ease assembly. The cooker 10 also includes a pair of base handles 24 extending radially outward from diametrically opposed positions on the base 12, and a pair of cover handles 26 extending radially outward from diametrically opposed positions on the cover 14. These are placed such that the cover handles 26 align with and overlie the base handles 24 when the cover 14 is in the locking position. This is shown in FIG. 1.

Figure 6:
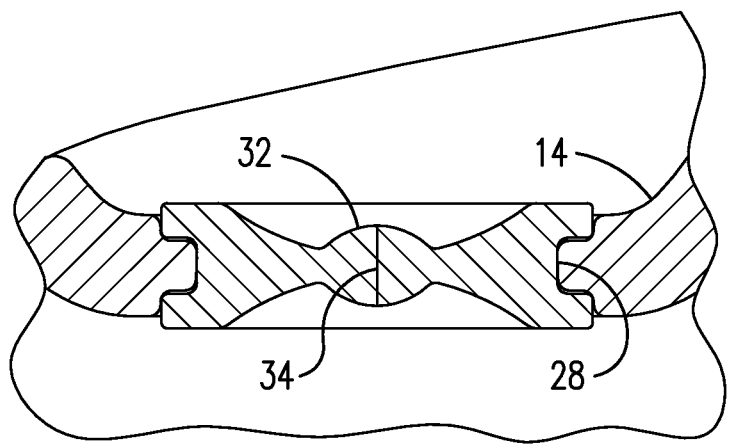
FIG. 6 is a detail cross-sectional view along line A-A of FIG. 1 illustrating the pressure relief valve.

The cover 14 includes first and second valve apertures 28 and 30, respectively, spaced from each other. The first aperture 28 will receive an elastomeric pressure relief valve 32 best illustrated in FIG. 6. The valve 32 takes the form of a disc sized for the first aperture 28 and having spaced peripheral flanges which will overly the top and bottom faces of the cover 14 to removably secure the valve 32 to the cover 14. The valve includes a slit or slits 34 and the valve will deform under pressure within the cooker to open the slit 34 and allow steam to vent while maintaining a desired pressure. As may be seen, it is preferred that the valve 32 be formed symmetrical such that either face may be inserted facing out and still operate properly.

Figure 7:
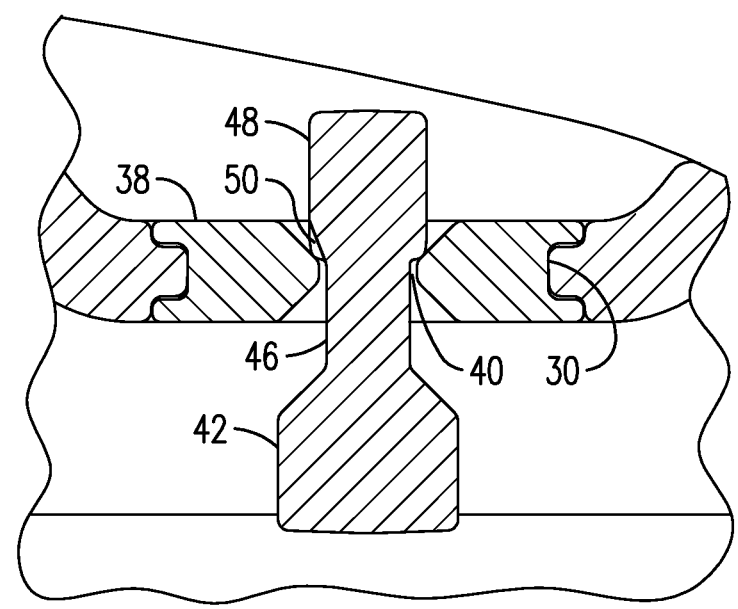
FIG. 7 is a detail cross-sectional view along line A-A of FIG. 1 illustrating the pressure indicator.

The second aperture 30 will receive a pressure indicator valve 36. As best shown in FIG. 7 the indicator valve includes an elastomeric indicator disc 38 secure similarly to that of relief valve 32, but including a central aperture 40. Received in central aperture 40 is an indicator stem 42 having an enlarged base 44 within the cooker 10, a neck 46 slidingly received within aperture 40, and a slightly enlarged head 48 to retain the stem 42 from falling through. As is known in the art, pressure within the cooker will cause the stem 42 to rise, providing a visual indication that the cooker is under pressure.

In the preferred embodiment, both apertures 28 and 30 are of the same diameter, as are valve 32 and disc 38. This arrangement will allow the user to place the valves 32 and 36 in either aperture 28 or 30 and prevent any incorrect assembly.

During cooling after cooking the indicator stem will eventually fall to the position shown in FIG. 7 due to a lack of internal pressure. While the neck 46 is smaller than the aperture 40, the lower end of head 48 can plug aperture 40 in this rest position. With further cooling of the food, this can cause a negative pressure situation within the cooker 10, causing it to be difficult to open. To avoid this, the lower end of head 48 includes at least one channel 50 providing fluid communication with atmosphere even in the rest position of FIG. 7. The channel 50 may be formed by two or more flanges 52 extending out from the lower end of the head 48. Alternatively, the indicator disc 38 may include channels (not shown) formed by extending ribs (not shown) about aperture 40 to allow this fluid communication. Each of these arrangements is intended to be encompassed by the term means for permitting fluid communication to atmosphere while in the rest position.

Figure 4:
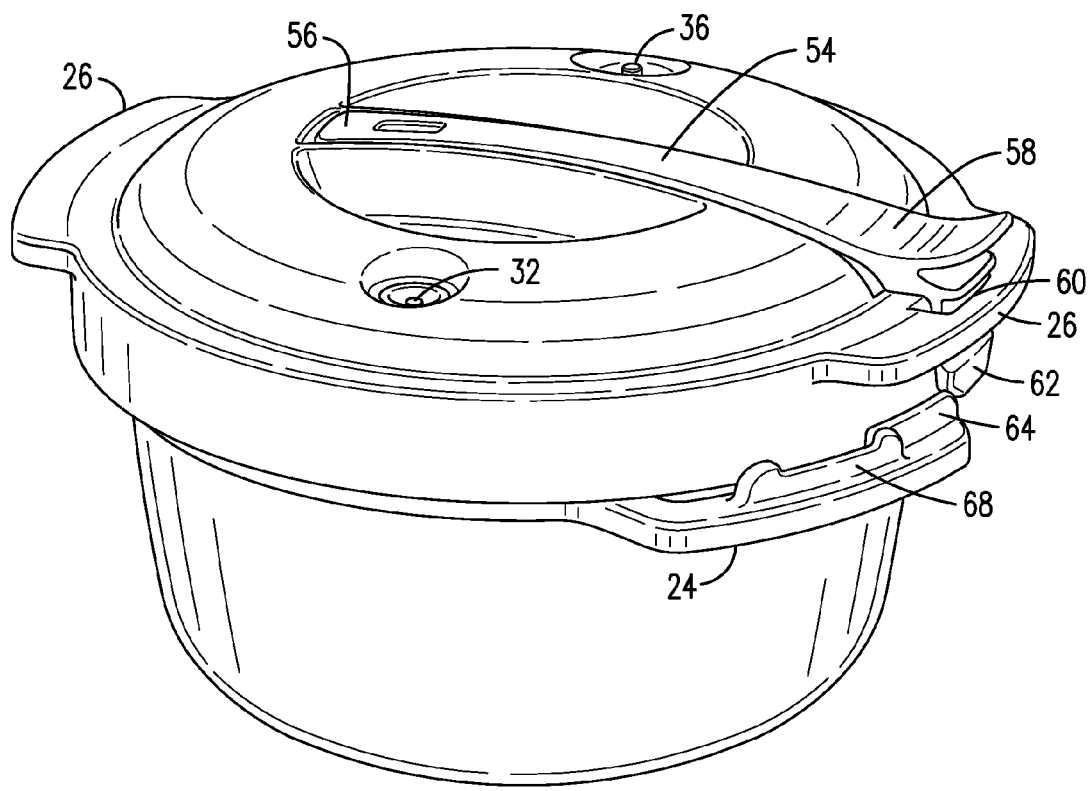
FIG. 4 is a top perspective view of the pressure cooker in the release position.

The cooker 10 also include a safety interlock arrangement. The cover 14 includes a lock bar 54 having a first end 56 hinged to the cover 14 to define a free end 58. The first end 56 may be hinged to the cover 14 via mating projections and depressions formed on the cover 14 and lock bar 54. The lock bar may thus be rotated (oscillated) upward and downward with respect to the cover 14. The free end 58 of the lock bar extends beyond lip 16 and above one of the cover handles 26. This cover handle 26 includes a slot 60 extending therethrough. The free end 58 of the lock bar 54 includes a lock tab 62 extending downward therefrom and sized to be freely received through the slot 60. As best shown in FIG. 4, when cover 14 is placed on base 10 in the release position the lock tab 62 will be adjacent a first edge of the base handle 24.

This first edge of the base handle 24 includes an upwardly projecting cam section 64 to engage with a leading edge 66 of the lock tab 62 as the cover 14 (and thus the lock tab 62) is rotated from the release position toward the lock position. One or both of the lock tab 62 and cam section 64 are tapered to smoothly lift the lock tab (and thus rotate the entire lock bar 54) during this cover rotation. The cam section 64 also defines a lock wall 68 at its rear edge forming a vertical abutment. The length of the cam section 64 is chosen so that when the cover 14 is in the lock position with respect to the base 12, the lock wall 68 is closely adjacent to a trailing edge 70 (FIG. 2) of the lock tab 62.

Figure 5A:
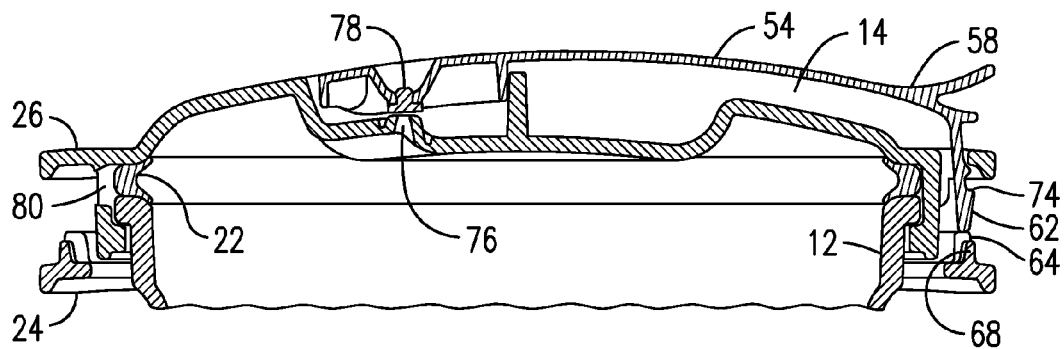
FIGS. 5a-5c are detailed cross-sectional views generally along line 5-5 of FIG. 1 illustrating the movements of the locking bar during locking and release.
Figure 5B:
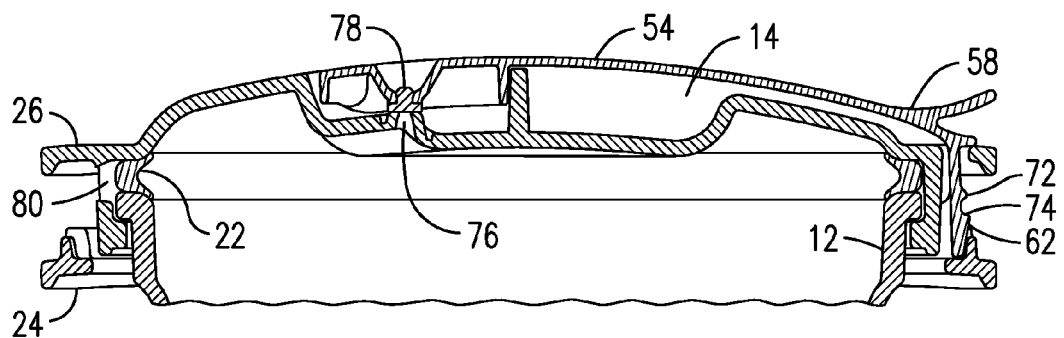

The locking operation will now be described. As noted, when the cover 14 is first placed on the base 12 in the release position the leading edge 66 of the lock tab 62 will be adjacent to the base handle 24 and the cam section 64 on that handle. This is best shown in FIG. 4. The user then manually rotates the cover toward the lock position (clockwise in the embodiment shown). This will cause the lock tab 62 to lift and ride over the cam section 64 (rotating the entire lock bar 54). This is best illustrated in FIG. 5a. Upon continued rotation the cover 14 will reach the lock position, at which point the lock tab 62 will reach the end of the cam section 64 and will drop downward under its own weight (again rotating the entire lock bar 54). In this position the trailing edge 70 of the lock tab 62 will be adjacent to the lock wall 68 formed by the end of the cam section 64. This is illustrated in FIGS. 1 and 5b.

Figure 5C:
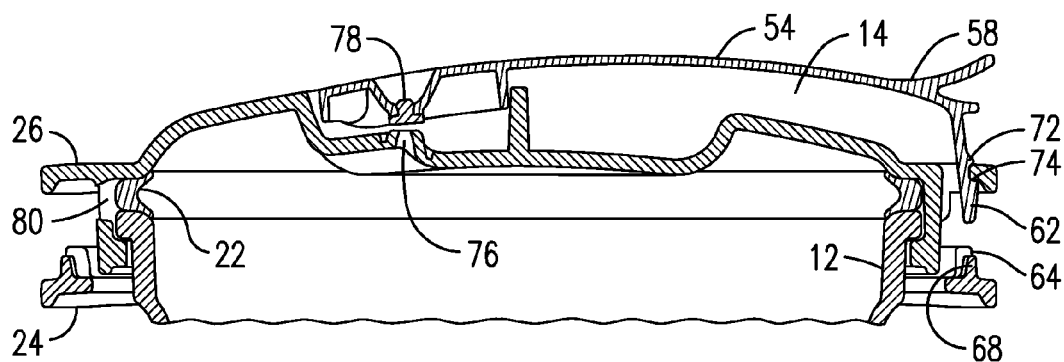

As may be envisioned, any attempt to manually rotate the cover 14 from the lock position toward the release position will be physically blocked by the lock tab 62 abutting against the lock wall 68. To open the cooker 10 the user must manually lift the lock bar 54 to move the lock tab 62 above the height of the lock wall 68. While not required, it is preferred to provide the lock tab 62 with a projecting spline 72 positioned to hold the lock tab in such a raised position by abutment with the slot 60 (with the lock tab 54 elastically deforming to allow the spline to ride over the slot 60). This is illustrated in FIG. 5c. With this arrangement the user need not hold the lock bar in the raised position of FIG. 5c and may instead grasp the various handles to rotate the cover 14. Finally, the free end of the lock tab 62 may include an undercut 74 intended to abut against slot 60 to prevent the lock tab 62 from falling out of the slot 60 when the user inverts the cover 14 during use.

While not required it is preferred that the cover 14 also include a blow vent 76 extending therethrough at a position beneath the lock bar 54. The lock bar 54 will then include a mating plug 78 on its lower face positioned to block the blow vent when the lock bar 54 is in the rest position. To provide an appropriate seal to ensure pressure within the cooker 10 the plug 78 may be formed as an elastomer button (as shown), or the blow vent 76 may have an elastomeric ring (not shown). Finally, the lip 16 of cover 14 may include a ring aperture 80 extending therethrough at a position adjacent the gasket 22. As best illustrated in FIGS. 5a-c, the ring aperture is sized to be blocked by the gasket 22 during normal use.

The operation and full safety features will now be described. When the cover 14 is first placed upon the base 12 in the release position the ledges 18 and 20 are not yet engaged. As such, the cover 14 may freely lift with respect to the base 12 and no pressure may be achieved in the cooker. Once the user begins to rotate the cover 14 toward the lock position then the lock tab 62 will ride up over the cam section 64. This will rotate the entire lock bar 54, thus lifting the plug 78 to open the blow vent 76. This again prevents pressure from being achieved in the cooker 10. Once the cover 14 has been rotated to the lock position the lock bar 54 will rotate downward with the lock tab 62 falling down the lock wall 68 of the cam section 64. This will cause the plug 78 to block the blow vent 76. At this point, with the ledges 18 and 20 fully engaged in the lock position, pressure may be achieved in the cooker 10 with a rise in internal temperature due to cooking.

The microwaves will pass through the cooker 10 to heat the food and thereby raising the internal pressure within the cooker 10. As the internal pressure rises, the indicator stem 42 will rise to provide a visual indication of proper operation to the user. The relief valve 32 is designed to deform and open the slit 34 upon reaching the desired operating pressure, to thus vent the cooker 10 and prevent any further pressure increase above operating pressure. However, should the indicator valve 36 become blocked and the pressure rise appreciably above operating pressure, then the indicator disc 38 is designed to deform and be blown from its aperture 30 to vent the cooker 10. Similarly, should the indicator disc 38 fail to unseat, and the pressure rise even further then the relief valve 32 is similarly designed to deform and be blown from the aperture 28. This would again vent the cooker 10. Should all these measures fail, and the pressure rise yet more, then the seal aperture 80 has been designed and sized to allow the gasket 22 to deform under pressure through the seal aperture 80 to again vent the cooker 10. Finally, should all previous measure fail and the pressure rise yet more, then the plug 78 will be lifted by the pressure (rotating the lock bar 54 upward against its own weight) to again vent the cooker 10. It is again noted that the lock bar 54 is not held in the rest position of FIG. 5*b*, but simply rests there under its own weight and is freely lifted by the user (or the internal pressure as described).

After the food has been cooked the proper time, microwaves are no longer applied. The food within the cooker 10 begins to cool and the internal pressure begins to reduce. The indicator stem 42 will fall when the pressure is reduced. The cooker 10 may still contain pressure, however. As noted above, rotation of the cover 14 from the lock position to the release position is blocked by the trailing edge 70 of the lock tab 62 butting against the lock wall 68. The user must first manually lift the lock tab 62, thus rotating the lock bar 54 to a position as illustrated in FIG. 5*c*. As shown there, this will move the plug 78 from blocking the blow vent 76. In this manner, the cooker 10 is automatically vented by the same operation which unlocks the cover for opening. This venting occurs while the cover is still in the lock position and the ledges 18 and 20 are still engaged. As such, it is ensured that the cooker is vented before the cover 14 reaches the release position.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A heatable container, comprising:
    a base;
    a cover;
    an aperture in the cover; and
    an indicator stem provided in the aperture, wherein the indicator stem has a base, a neck and a head; and
    means is provided for permitting fluid communication to atmosphere while in a rest position, wherein the means for permitting fluid communication to atmosphere while in said rest position includes at least two flanges provided on the indicator stem between the base and the head; and
    a channel is formed by the at least two flanges.

2. A heatable container as in claim 1, wherein:
    an indicator disc is provided in the cover, and the aperture is in the indicator disc.

3. A heatable container as in claim 2, wherein:
    the indicator stem is movable between a raised position under pressure and said rest position.

* * * * *